United States Patent
Liu et al.

(10) Patent No.: US 8,218,854 B2
(45) Date of Patent: Jul. 10, 2012

(54) METHOD FOR SYNTHESIZING IMAGE WITH MULTI-VIEW IMAGES

(75) Inventors: Kai-Che Liu, Kaohsiung (TW); Jen-Tse Huang, Taipei County (TW); Hong-Zeng Yeh, Taipei County (TW); Fu-Chiang Jan, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 915 days.

(21) Appl. No.: 12/126,936

(22) Filed: May 26, 2008

(65) Prior Publication Data

US 2009/0185759 A1 Jul. 23, 2009

(30) Foreign Application Priority Data

Jan. 21, 2008 (TW) .............................. 97102185 A

(51) Int. Cl.
*G06K 9/00* (2006.01)
*G06K 9/36* (2006.01)
*G06K 9/32* (2006.01)

(52) U.S. Cl. .................... 382/154; 382/285; 382/294

(58) Field of Classification Search .................. None
See application file for complete search history.

(56) References Cited

U.S. PATENT DOCUMENTS

| | | | |
|---|---|---|---|
| 6,677,949 B1* | 1/2004 | Gioia | 345/428 |
| 6,856,707 B2 | 2/2005 | Enomoto | |
| 6,903,735 B2 | 6/2005 | Jeong et al. | |
| 7,161,606 B2* | 1/2007 | Gonzalez-Banos et al. | 345/646 |
| 7,742,657 B2* | 6/2010 | Kim et al. | 382/284 |
| 2004/0001059 A1* | 1/2004 | Pfister et al. | 345/419 |

FOREIGN PATENT DOCUMENTS

| | | |
|---|---|---|
| TW | 493102 | 7/2002 |
| TW | 569617 | 1/2004 |
| TW | I246031 | 12/2005 |

OTHER PUBLICATIONS

Rosenblatt, Judah. Basic Statistical Methods and Models for the Sciences. 2002. Chapman & Hall. p. 76.*
Kevin Kreeger, Ingmar Bitter, Frank Dachille, Baoquan Chen and Arie Kaufman. Adaptive Perspective Ray Casting. IEEE Symposium on Volume Visualization, 1998, pp. 55-62.*
"Office Action of Taiwan Counterpart Application", issued on Jun. 7, 2011, P1-P4, in which the listed references were cited.

* cited by examiner

*Primary Examiner* — Jason M Repko
*Assistant Examiner* — David F Dunphy
(74) *Attorney, Agent, or Firm* — Jianq Chyun IP Office

(57) ABSTRACT

A method for synthesizing an image with multi-view images includes inputting multiple images, wherein each of the reference images is corresponding to a reference viewing-angle for photographing; synthesizing an image corresponding to a viewpoint and an intended viewing-angle; segmenting the intended synthesized image to obtain a plurality of meshes and a plurality of vertices of the meshes. Each of the vertices and the viewpoint respectively establish a viewing-angle, and the method further includes searching a plurality of neighboring images among the reference images referring to the viewing-angle. If at least one of the neighboring images falls within an adjacent region of the vertex, a first mode is adopted without interpolation to synthesize the intended synthesized image; when none of the neighboring images falls within the adjacent region of the vertex, a second mode is adopted, where a weighting-based interpolation mechanism is used for synthesizing the intended synthesized image.

20 Claims, 9 Drawing Sheets

METHOD FOR SYNTHESIZING IMAGE WITH MULTI-VIEW IMAGES

CROSS-REFERENCE TO RELATED APPLICATION

This application claims the priority benefit of Taiwan application serial no. 97102185, filed on Jan. 21, 2008. The entirety of the above-mentioned patent application is hereby incorporated by reference herein and made a part of this specification.

BACKGROUND OF THE INVENTION

1. Field of the Invention

The present invention relates to a virtual image producing technique.

2. Description of Related Art

Usually, when a real scene is shot by a camera, it is unable to precisely derive the image taken in another viewing-angle. In order to relatively and precisely derive the images with different shooting angles from the above-mentioned cameras, traditionally, several images taken in the neighbouring angles are needed to synthesize an intended image.

A complete multi-view image video system includes a plurality of processing steps. FIG. 1 is a schematic flowchart for image processing of a conventional multi-view image/video system. Referring to FIG. 1, the image processing flowchart mainly includes step 100 for capturing image or video. Next in step 102, a camera calibration is conducted. In step 104, a multi-view coding (MVC) is conducted. In step 106, a MVC decoding is conducted. Step 108 is to synthesize the virtual view, which includes view generating, synthesizing, rendering, interpolation. In step 110, a synthesized image is displayed at a display platform.

Although some of conventional computer visualization technologies are provided to obtain 2-D images of different viewing-angles, a portion of an image with a larger variation, such as an edge area of an object, would be blurry, according to the conventional method. Therefore, the conventional image synthesizing technology needs to be improved.

SUMMARY OF THE INVENTION

Accordingly, the present invention is directed to a method for synthesizing an image with multi-view images capable of improving the image synthesizing effect by using image interpolation schemes in different modes. Particularly, the clarity of object edges can be improved a lot.

The present invention provides a method for synthesizing an image with multi-view images. The method includes: inputting a plurality of reference images, wherein each of the reference images is yielded by correspondingly photographing a reference viewing-angle; determining an intended synthesized image according to a corresponding viewpoint and an intended viewing-angle; segmenting the intended synthesized image to obtain a plurality of meshes and a plurality of vertices of the meshes, wherein each of the vertices and the viewpoint respectively establish a viewing-angle; searching a plurality of neighbouring images among the reference images referring to the viewing-angle; if at least one of the neighbouring images falls within an adjacent region of the vertex, using a first mode to synthesize the intended image, and when none of the neighbouring images falls within the adjacent region of the vertex, using a second mode to synthesize the intended image.

By using the first mode, for example, the conventional interpolation is not used so as to maintain, for example, the image edges to enhance the clarity effect. The second mode adopts a weighing-based image interpolation (multi-texture blending) and, for example, through averaging to synthesize a new image so as to provide the higher visualization effect.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
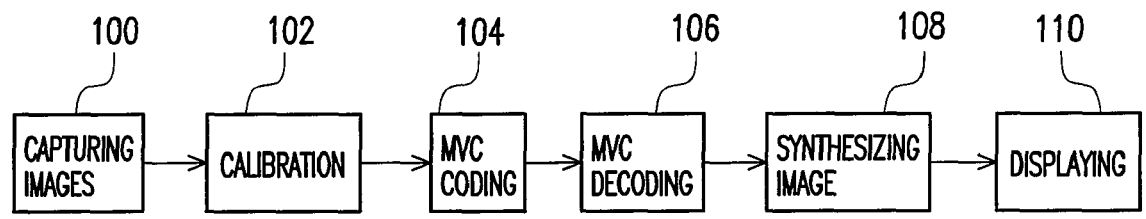
FIG. 1 is a schematic flowchart for image processing of a conventional multi-view image/video system.

Reference will now be made in detail to the present preferred embodiments of the invention, examples of which are illustrated in the accompanying drawings. Wherever possible, the same reference numbers are used in the drawings and the description to refer to the same or like parts.

The following embodiments are provided for depicting the aspect of the present invention but the present invention are not limited to the provided embodiments, and an appropriate combination between the described embodiments is feasible to implement the present invention.

Figure 2:
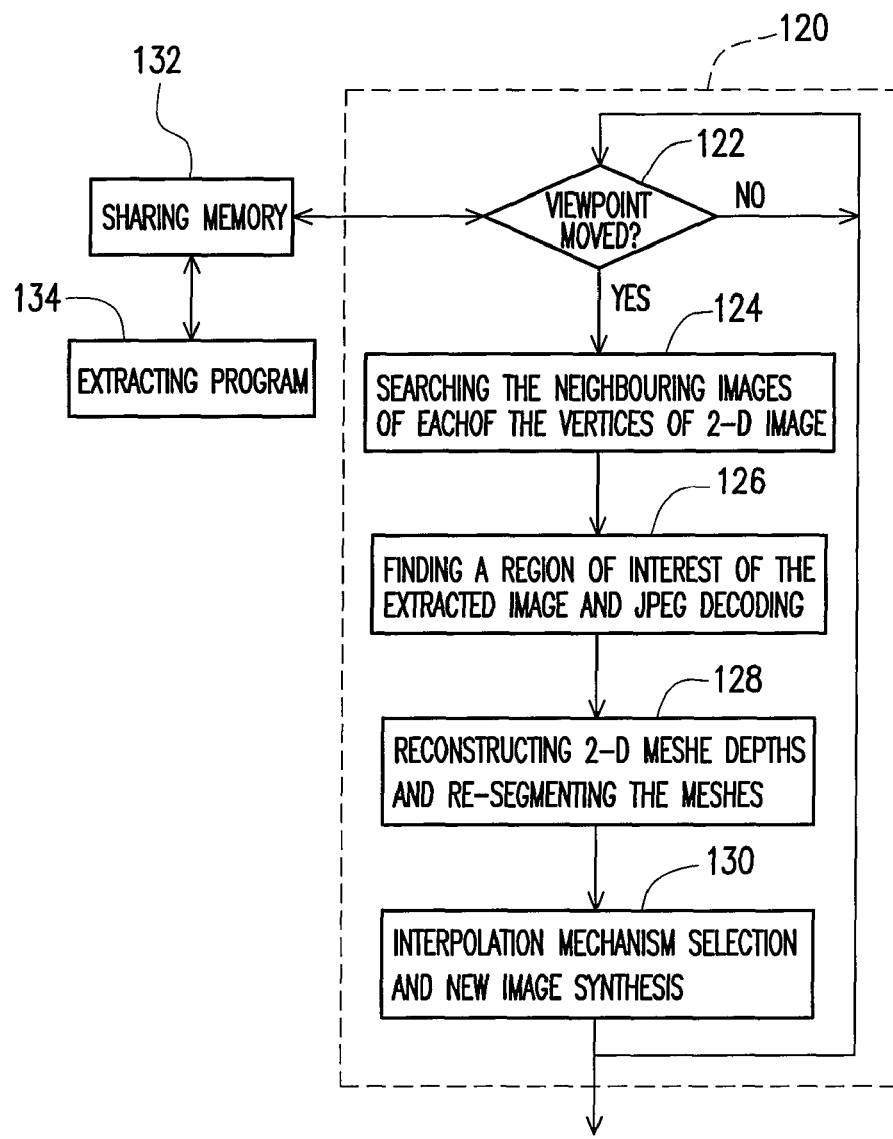
FIG. 2 is an algorithm flowchart according to an embodiment of the present invention.

In the technique for synthesizing an image with multi-view images, a depth-based interpolation is a useful 2.5-D (two and a half dimensions) space viewing-angle synthesizing approach where two concepts of image and model are combined. The relevant algorithm is performed by using plane sweeping scheme, which sweeps every depth plane in the space through the constructed light beam passing every vertex of the meshes of a 2-D image so as to establish the most appropriate depth information. FIG. 2 is an algorithm flowchart according to an embodiment of the present invention. Referring to FIG. 2, a step 120 of performing an algorithm includes: step 122 for judging whether or not the viewpoint is moved, wherein the operation includes sharing a memory 132 and extracting a plurality of reference images corresponding to different reference viewing-angles using an extracting program 134, and when the viewpoint is moved, the algorithm operation starts. In step 124, a virtual 2-D image to be produced is segmented into a plurality of meshes, and some neighbouring reference images are respectively searched according to the position and the viewing-angle direction of each the vertex of each the mesh. In step 126, region of interests (ROIs) of the extracted images are found. In step 128, the depth values of scene corresponding to each the vertex of the intended virtual 2-D image are created. In step 130, image synthesizing is performed depending on different mode selection.

Figure 5:
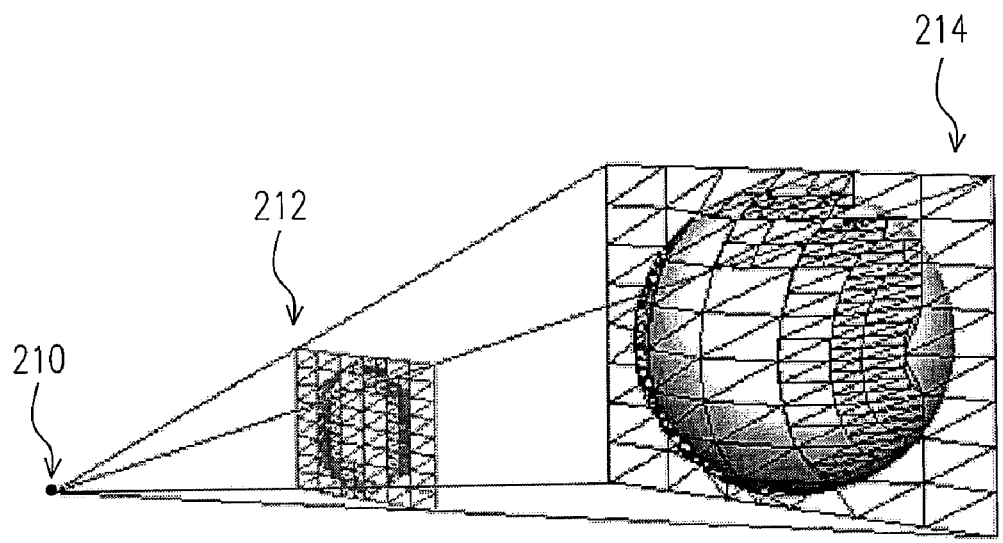
FIG. 5 is a diagram showing the relationship between a 2-D image and the corresponding 3-D image having depth information.
Figure 6:
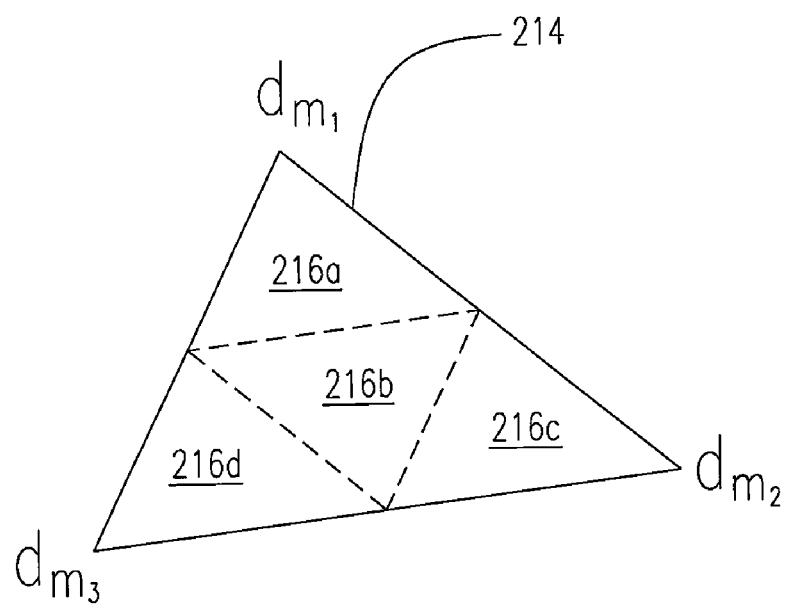
FIG. 6 is a diagram showing re-segmenting of a mesh according to an embodiment of the present invention.

FIG. 5 is a diagram showing the relationship between a 2-D image and the corresponding 3-D image having depth information. Referring to FIG. 5, meshes of the extracted 2-D image 212 corresponding to a viewpoint 210, according to the common image processing technique, would be mapped to the meshes of a 3-D image 214 with depth information, wherein a sphere as an example is exemplarily taken to illustrate the depth variation thereof. On the 2-D image 212, for example, a plurality of larger meshes are segmented, and the shape of each mesh is triangular, for example, but the present invention is not limited to be triangular. Since the depths at an edge of the spherical surface are greatly varied, the segmentation density of the relevant meshes must be somewhat higher so as to describe the depth variation. FIG. 6 is a diagram showing re-segmenting of a mesh according to an embodiment of the present invention. Referring to FIG. 6, different calculated depth dm1, dm2 and dm3 are corresponding to the three vertices of a mesh on the 3-D image 214. When the depth variation is greater than a threshold, it indicates the special depth variation of an object is large, and it is needed to re-segment each of the meshes into smaller meshes; for example, an initial mesh can be re-segmented into four triangle meshes 216a-216d so as to display a finer depth variation.

Figure 7:
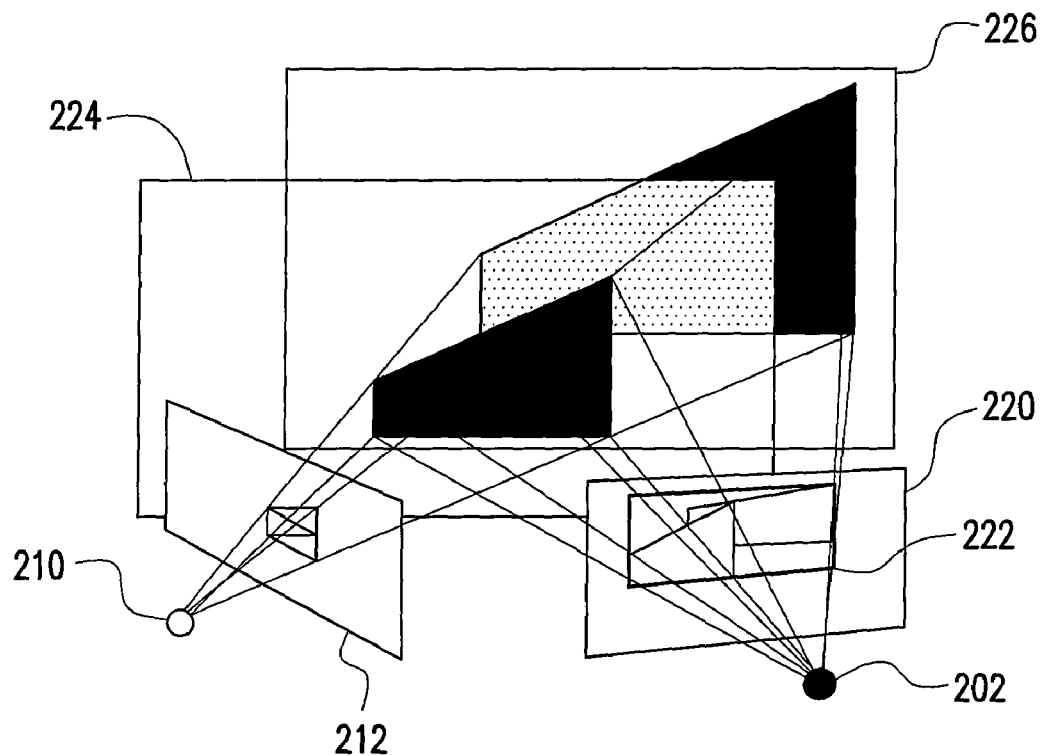
FIG. 7 is a diagram showing the selection of a region of interest (ROI) according to an embodiment of the present invention.

In the following, the depths of a vertex, the condition to decide re-segmenting and the selection of an ROI are explained. FIG. 7 is a diagram showing the selection of a region of interest (ROI) according to an embodiment of the present invention. Referring to FIG. 7, in the present invention, the job of selecting an ROI 222 is not absolutely required, but in consideration of the relevant computation, it is preferable to select an image block of an ROI, where calculations of depths and interpolation merely on the ROI image block are performed so as to save the computation. Usually, it is reasonable to assume that an intended virtual 2-D image has a minimum depth and a maximum depth. The intended virtual 2-D image 212 is segmented into meshes, and the meshes are projected onto another image 220 according to the vertices of the initial meshes, the viewpoint, a maximum depth plane 226 and a minimum depth plane 224, which is, for example, a reference image 220 captured by a camera 202. At a position projected by the maximum depth plane 226 on the image 220, there is a distribution area; while at a position projected by the minimum depth plane 224, there is another distribution area. With the scheme of selecting an ROI block, the ROI block is composed of the two distribution areas, wherein the ROI block is enclosed mainly by an epipole line known by anyone skilled in the art.

Figure 8:
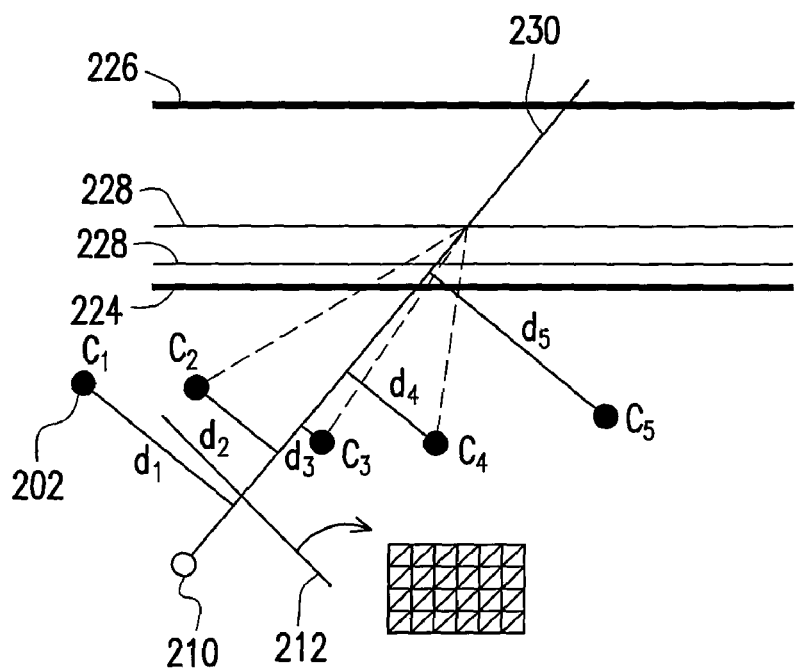
FIG. 8 is a diagram showing searching a plurality of neighbouring images corresponding to a vertex according to an embodiment of the present invention.

The neighbouring reference images corresponding to each vertex are searched. FIG. 8 is a diagram showing searching a plurality of neighbouring images corresponding to a vertex according to an embodiment of the present invention. Referring to FIG. 8, between the plane 224 with the minimum depth $d_{min}$ and the plane 226 with the maximum depth $d_{max}$, M planes 228 with preset depths are defined between them, where the maximum depth is represented by $d_{max}$, the minimum depth is represented by $d_{min}$ and the m-th depth dm 228 is expressed by:

$$d_m = \frac{1}{\frac{1}{d_{max}} + \frac{m}{M-1}\left(\frac{1}{d_{min}} - \frac{1}{d_{max}}\right)} \qquad (1)$$

wherein m is between 0 and (M−1). The depths dm 228 are not obtained by dividing with an equal interval, but with an increasing interval from the minimum depth to the maximum depth, so as to enable finding an appropriate depth over an area with a larger depth.

Then, a plurality of meshes are segmented on the virtual 2-D image 212 and each mesh has a plurality of vertices. The neighbouring reference images relatively to the viewing-angle line 230 are found according to, for example, the viewing-angle line 230 and the viewing-angle for the camera 202 to take each of the reference images, wherein the neighbouring extents are, for example, sequentially C3, C2, C4, C1, C5 . . . . A certain number of the reference images from the reference images are selected as the neighbouring reference images.

Figure 13:
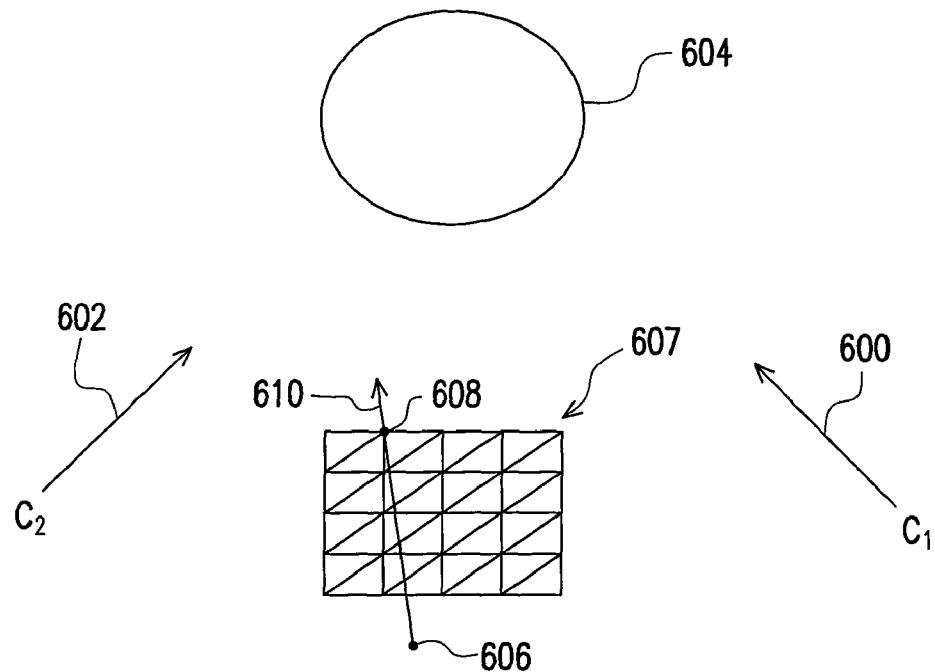
FIG. 13 is a diagram showing searching neighbouring reference images.

FIG. 13 is a diagram showing searching neighbouring reference images in another way. Referring to FIG. 13, at the time, for a viewpoint 606, each of the vertices 608 on a virtual 2-D image 607 has a viewing-angle line 610 to observe an object 604. Taking the viewing-angle line 610 as a reference direction, a set of neighbouring reference images is searched. The number of the neighbouring reference images needs to be multiple; and usually, for example, four neighbouring reference images are taken for the successive interpolation calculation. The viewing-angle line 600 of a camera $C_1$ or the viewing-angle line 602 of a camera $C_2$ has an included angle with the viewing-angle line 610. By, for example, analyzing the included angles, the neighbouring cameras can be found. In addition to the included angles, other factors can be considered as well so as to have different determination rules depending on different designs. Each of the vertices correspondingly has a set of neighbouring reference images.

Figure 14:
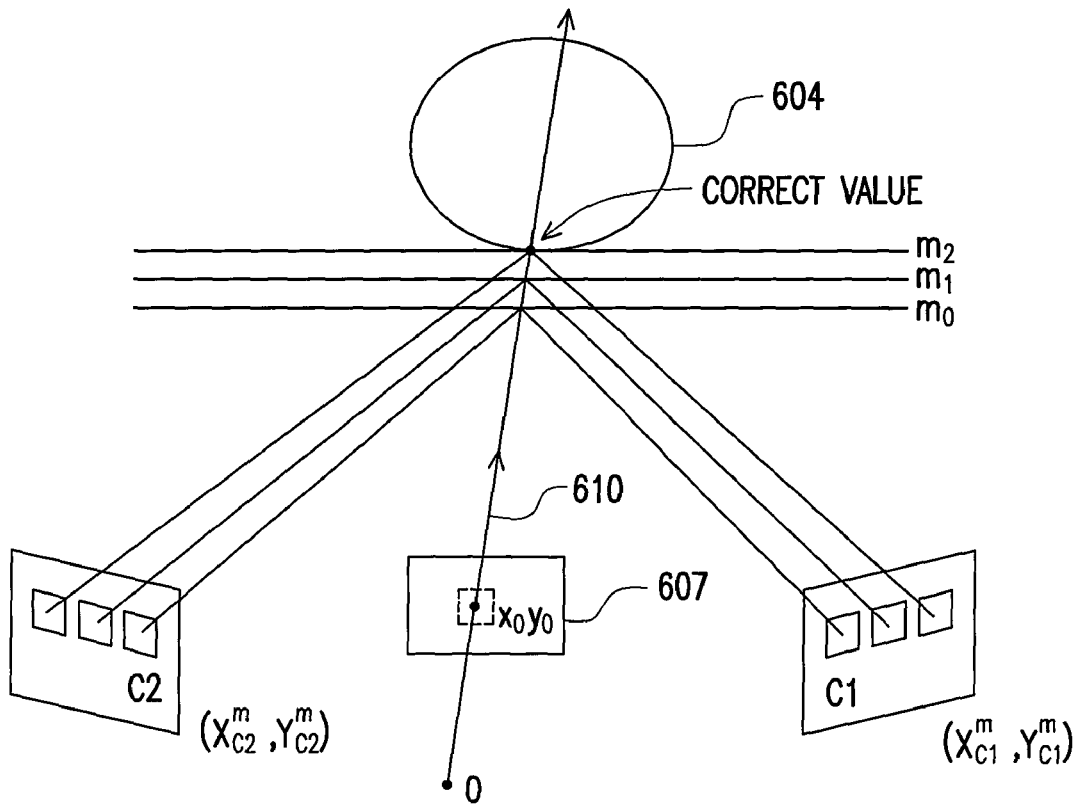
FIG. 14 is a diagram showing how to determine an appropriate depth corresponding to a vertex according to an embodiment of the present invention.

Referring to FIG. 8 again, there are different depth planes 228 between the maximum depth plane 226 and the minimum depth plane 224, but there is a depth among them is most close to the real depth, namely, an appropriate depth to be determined corresponding to each vertex. FIG. 14 is a diagram showing how to determine an appropriate depth corresponding to a vertex according to an embodiment of the present invention. Referring to FIG. 14, there are, for example, three depth planes m0, m1 and m2 shown in FIG. 14. In terms of a viewing-angle line 610 passing a vertex, the viewing-angle line 610 is respectively projected onto the neighbouring reference images of the camera at different positions according to the different depth planes m0, m1 and m2. For example, the position on the virtual 2-D image 607 of the viewing-angle line 610 is $(x_0, y_0)$. Note that, a same position can have three projection positions $(x_{c1}^m, y_{c1}^m)$, wherein m=0, 1, 2, on each of the neighbouring reference images of a camera C1 due to different projection depths. Similarly, a same position can have three projection positions $(x_{c2}^m, y_{c2}^m)$, wherein m=0, 1, 2, on each of the neighbouring reference images of another camera C2 due to different projection depths. Thus, on each of the selected neighbouring reference image, there are three positions.

It can be deducted if the projection depth is correct, the image spots at an individual projection position respectively on the neighbouring reference images should have almost the same color of the same object. Accordingly, if the images on the neighbouring reference images within an area at the projection position are almost same by testing, the trial depth dm of the vertex is close to the real depth. As shown in FIG. 8, by comparing the different depths with each other, an optimum depth can be obtained.

Figure 15:
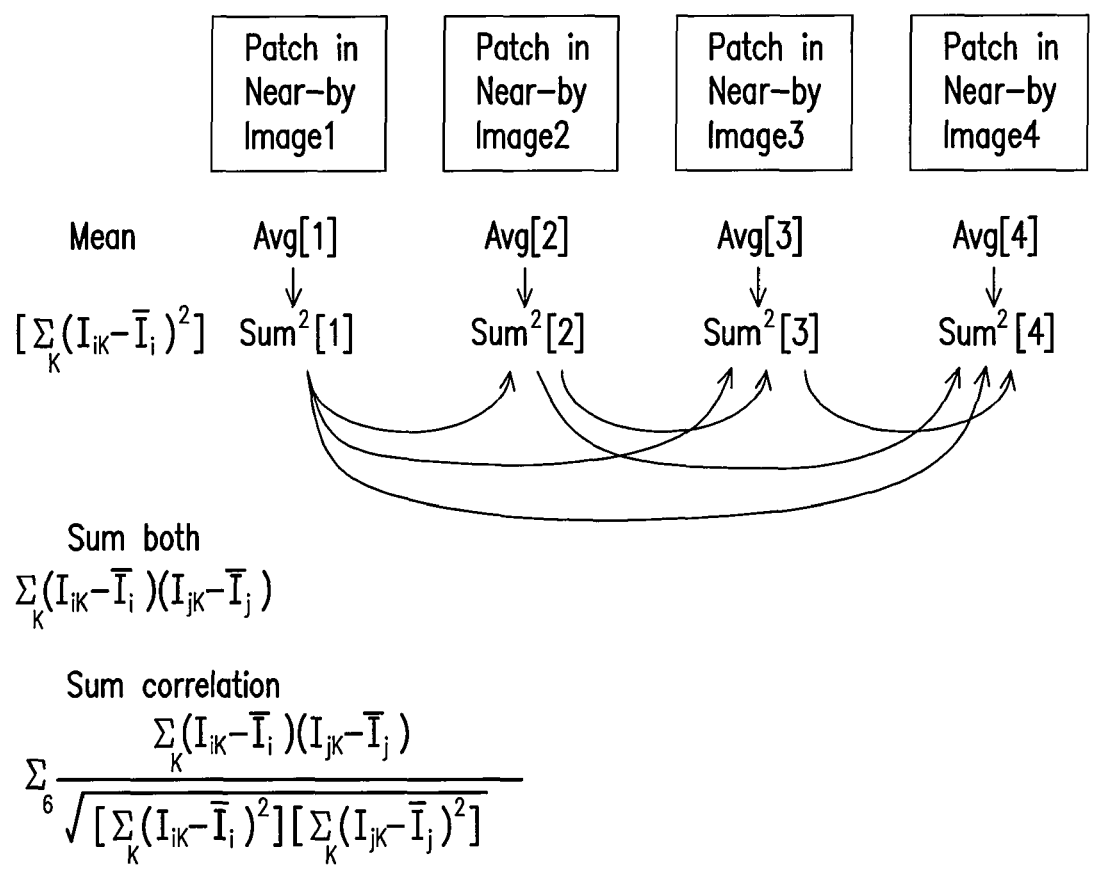
FIG. 15 is a drawing, schematically illustrating the mechanism to analyze the color consistency.

The color consistency between the neighbouring reference images can be obtained by mathematic analysis. Each of the vertices has a set of neighbouring images corresponding to each the trial depth, and the image difference value between the neighbouring images on an image area at each of the projection positions is analyzed. In the following, a scheme, but not limited to, is provided. The scheme is to calculate, for example, a correlation parameter $r_{ij}$:

$$r_{ij} = \frac{\sum_k (I_{ik} - \overline{I_i})(I_{jk} - \overline{I_j})}{\sqrt{\left[\sum_k (I_{ik} - \overline{I_i})^2\right]\left[\sum_k (I_{jk} - \overline{I_j})^2\right]}} \quad (2)$$

where i and j represent any two of the neighbouring images, $I_{ik}$ and $I_{jk}$ represent the k-th image data within the image areas respectively corresponding to the i neighbouring image and the j neighbouring image, and $\overline{I_i}$ and $\overline{I_j}$ represent the averaged pixel data values within the image area. Taking four neighbouring reference images as an example, there are six correlation parameters $r_{ij}$ in total and the value r of the prediction depth can be obtained by averaging. Thereafter, a prediction depth with the greatest value r can be found by comparing the values r of all the depths, and the depth with the greatest value r is the optimum depth value and the appropriate depth of the vertex is also decided. In more detail mechanism for color consistency is shown in FIG. 15. FIG. 15 is a drawing, schematically illustrating the mechanism to analyze the color consistency. In FIG. 15, for example, there are four patches in nearby images. Each one is taken averaged as indicated by Avg[1], Avg[2], Avg[3], and Avg[4]. Then four summation of $$\sum_k (I_{ik} - \overline{I_i})^2$$

are obtained as indicated by Sum²[1] to Sum²[4]. Another summation of $$\sum_k (I_{ik} - \overline{I_i})(I_{jk} - \overline{I_j})$$

is calculated. Then, the summation of six possible correlations of the correlation parameter $r_{ij}$ in different index of i and j is calculated for judgment. Likewise, the rest appropriate depths of all the vertices on the virtual 2-D image can be obtained by calculation.

Corresponding to the case of FIG. 6, if the depth difference of the vertices of a mesh is excessive, which indicates the area needs to be segmented more finely, and thus, the previous steps are repeated for calculating the depth values of newly segmented vertices. The criteria for judging whether or not to re-segment is, for example:

$$\max_{p,q \in \{1,2,3\}, p \neq q} |m_p - m_q| > T. \quad (3)$$

That is to say, whenever the difference value of a pair is greater than a threshold T, a re-segmentation needs to be conducted.

Figure 9:
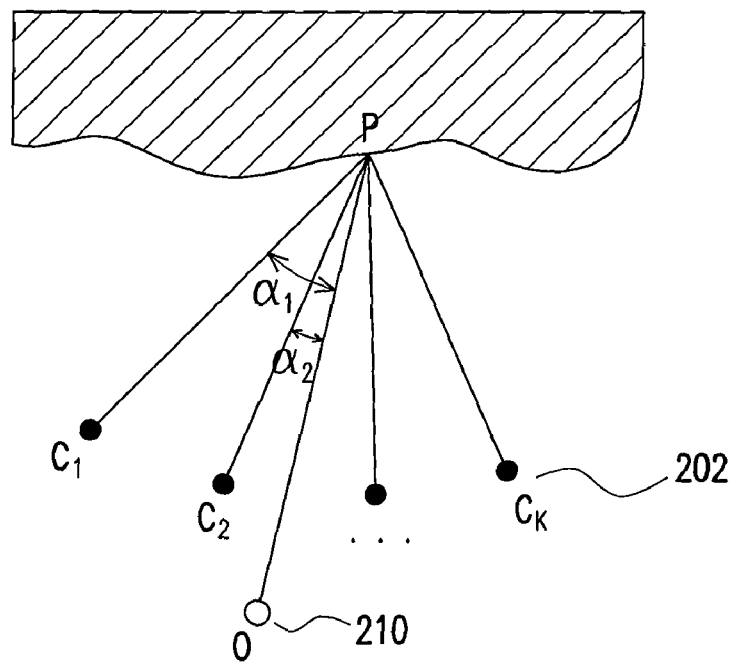
FIG. 9 is a diagram showing how included angle parameters are defined according to an embodiment of the present invention.

Further, when the depth of each vertex is obtained, image synthesizing is performed by projecting the vertex onto the neighbouring reference images at the corresponding projection points, according to the depth. A weighting value of each of the neighbouring reference images can be determined referring to commonly known computer visualization knowledge. The major parameter of the weighting value is the included angle. FIG. 9 is a diagram showing how included angle parameters are defined according to an embodiment of the present invention. When a point P on an object surface is viewed by a viewpoint 210, there are different included angles corresponding to the point P on the object surface and the viewing-angles of different cameras. In general, the larger the included angle, the more the viewing-angle of the camera is deflected and less the corresponding relative weight is.

Figure 10A:
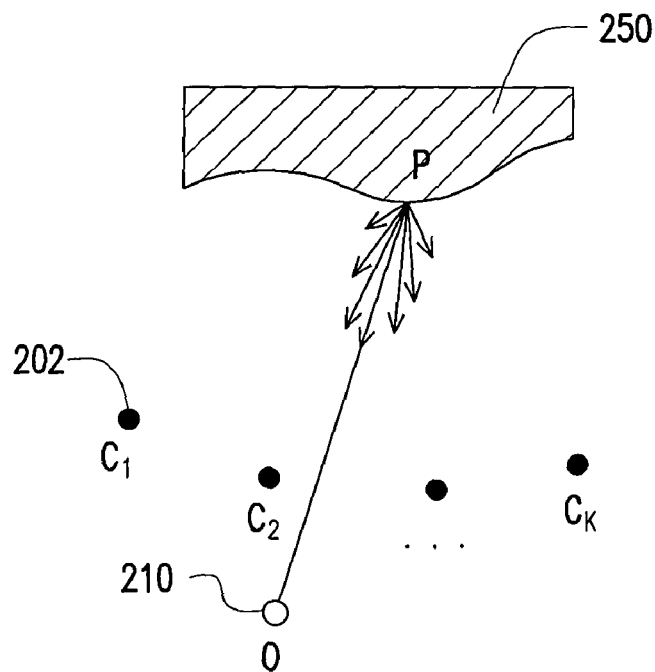
FIGS. 10A-10C are diagrams showing several cases causing inconsistency.
Figure 10B:
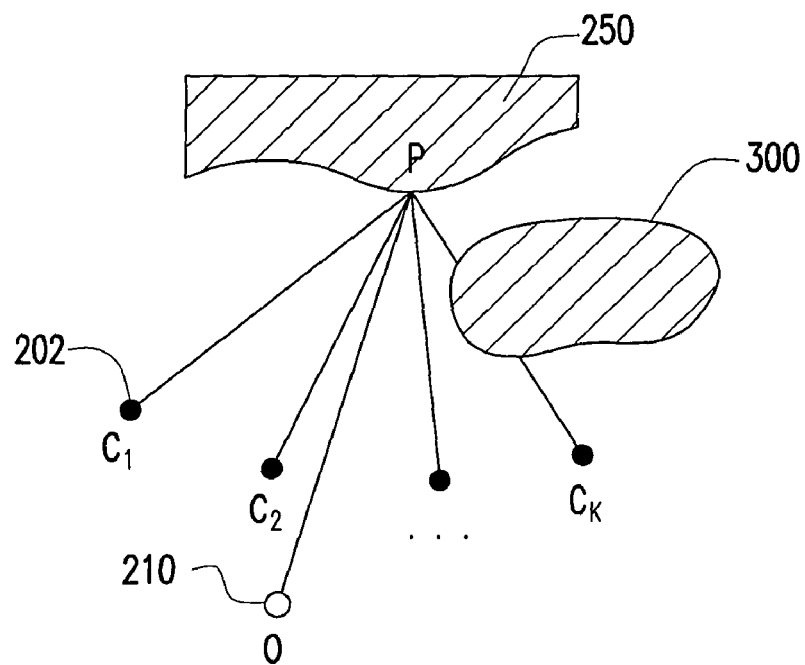
Figure 10C:
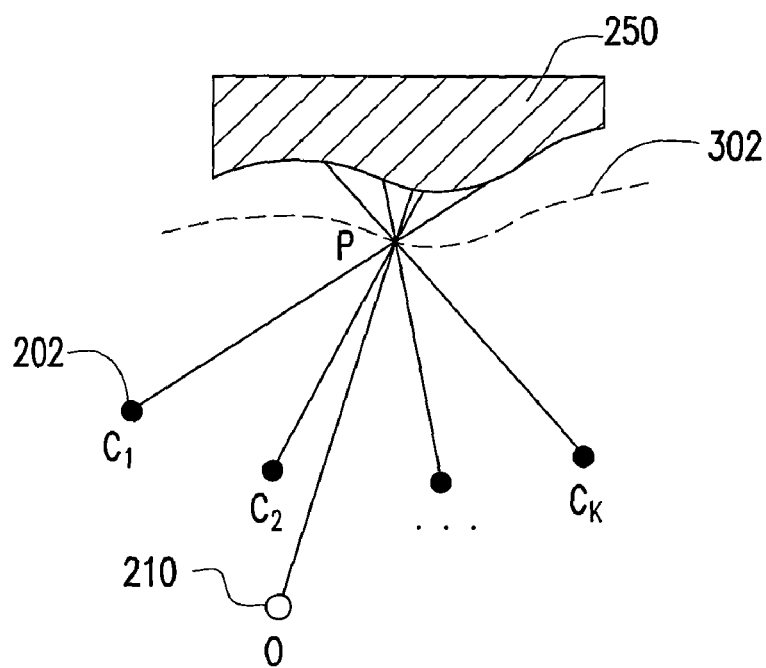

Note that some of special situations are needed to consider when determining a weighting value. FIGS. 10A-10C are diagrams showing several cases causing inconsistency. FIG. 10A is a diagram showing the surface of an object 250 is a non-lambertian surface, which results in an error. FIG. 10B is a diagram showing an occlusion 300 prevents complete projections. FIG. 10C is a diagram showing an incorrect geometric surface prediction. All of the above-mentioned three situations would affect the weighting value of each the neighbouring image. The common used approach for obtaining weighting values has taken the above-mentioned situations in consideration so as to obtain the weighting values of the neighbouring images.

Figure 3:
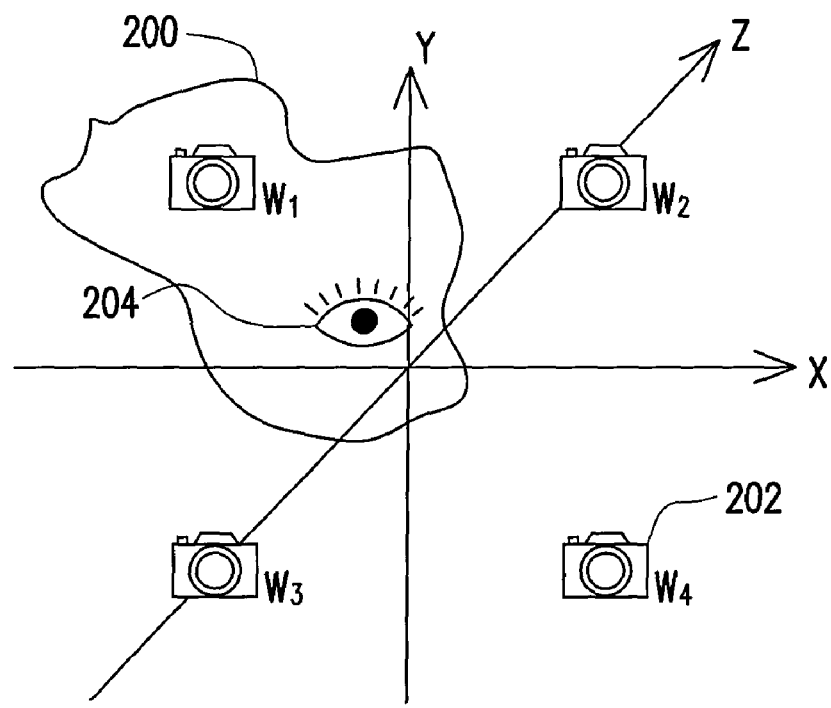
FIG. 3 is a diagram showing an interpolation mechanism for synthesizing an image adopted by an embodiment of the present invention.
Figure 4:
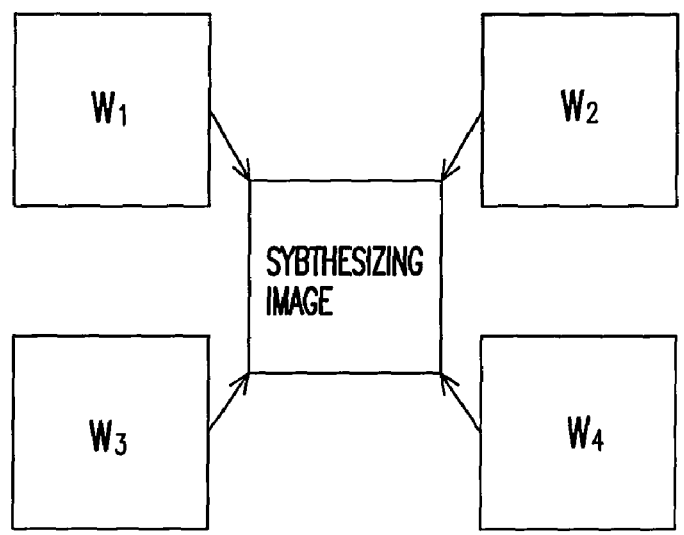
FIG. 4 is another diagram showing the interpolation mechanism for synthesizing an image of FIG. 3 adopted by an embodiment of the present invention.

In more detail, FIG. 3 is a diagram showing an interpolation mechanism for synthesizing an image adopted by an embodiment of the present invention. Referring to FIG. 3, four reference images are taken as an example. An object 200 is photographed by four cameras 202 at four positions to obtain four reference images. There is difference between the viewpoint 204 and the positions of the cameras 202. In order to obtain an image from the viewpoint 204 to watch the object 200, usually an image interpolation corresponding to the four reference images is used. FIG. 4 is another diagram showing the interpolation mechanism for synthesizing an image of FIG. 3 adopted by an embodiment of the present invention. The intended image can be obtained by assigning four weights W1-W4 to the four reference images and performing a spatial relationship calculation corresponding to a virtual viewpoint, wherein a simpler traditional scheme is to perform a weighting-based interpolation on the four reference images by multi-texture blending. However, one of the disadvantages of the interpolation is that the scheme would cause the intended image blurry, i.e., the synthesized image in the traditional scheme has poor image effect and it is easily to make the edges blurry.

In a multi-view system, the image synthesizing interpolation is the key technique, which affects the quality of the finally output image. However, as pointed out hereinbefore, the current image synthesizing approach has advantages. The present invention provides a novel image mixed interpolation mechanism, which takes the spatial positions of the virtual image and the photographed images in consideration, plus considering the advantage/disadvantage of the weighting methodology so as to lower the usage proportion of interpolation and remain the image quality and the visualization effect.

Qualitatively, in terms of the viewing-angle of an intended image, the searching operation is conducted, for example, outwards to cover a preset adjacent region. When at least one of the neighbouring images falls within the adjacent region of a vertex, it indicates that a photographing camera is close enough to the viewpoint, so that the first mode is used to produce the intended synthesized image. When none of the neighbouring images falls within the adjacent region of the vertex, the second mode is used to produce the intended synthesized image.

Quantitatively, for example, by analyzing the difference extent between a maximum weighting value Wmax1 and a next-to-maximum weighting value Wmax2, it is judged whether or not the photographing camera is close enough to the viewpoint so as to decide using the first mode or the second mode. For a unified standard, for example, a normalization processing on the maximum depth value and the next-to-maximum depth value is performed, and a difference value analyse is performed. If the difference value is greater than a preset index, it means that the image with the maximum weighting value has the position close enough to the intended synthesized image and the first mode is used; otherwise, the second mode is used.

In general, if all images are produced by using interpolation synthesizing, some areas with larger depth variations become blurry. The present invention provides two modes to synthesize images. In the first mode, since a camera is within an adjacent region close enough to the viewing-angle line, therefore, the position and the viewing-angle angle of the camera is quite close to the position and the viewing-angle of the intended synthesized image. In order to have a good sharpness of the edge depth, for example, the corresponding image information is directly adopted without interpolation.

Another situation in the first mode is as follows. If a single neighbouring image falls within the adjacent region, an image color data is directly taken. If two or more of the neighbouring images fall within the adjacent region, for example, an image color data of the neighbouring image having the maximum weighting value is taken, or the average of the two or more neighbouring images is taken to obtain an image color data.

When the second mode is adopted by judging, for example, a weighting-based interpolation is performed to obtain the intended image color data according to the neighbouring images. In other words, the first mode favours to maintain, for example, the sharp edge, and the second mode favours an image synthesizing of a general area so as to obtain a better synthesizing effect.

Figure 11:
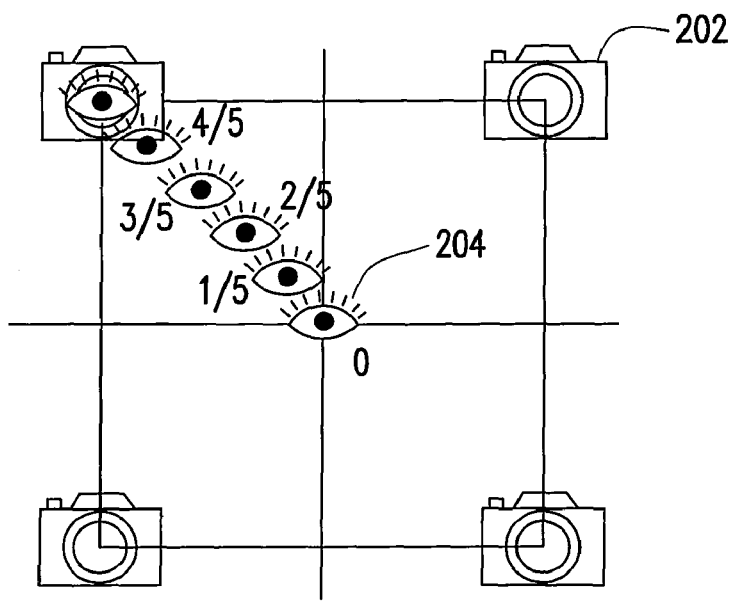
FIG. 11 is a diagram of validation according to an embodiment of the present invention.

FIG. 11 is a diagram of validation according to an embodiment of the present invention. Referring to FIG. 11, during analyzing the difference extent, for example, between the maximum weighting value Wmax1 and the next-to-maximum weighting value Wmax2, the preset index is a given value. When Wmax1−Wmax2>index, the first mode is adopted, otherwise, the second mode is adopted. Taking the image provided by four neighbouring cameras 202 as an example, assuming the position of the viewpoint 204 at the center point is represented by '1', and the position of the viewpoint 204 at the position of a camera 202 is represented by '0', when the viewpoint takes the position of '0', it means the viewpoint 204 is at the position of one of the four cameras.

Figure 12:
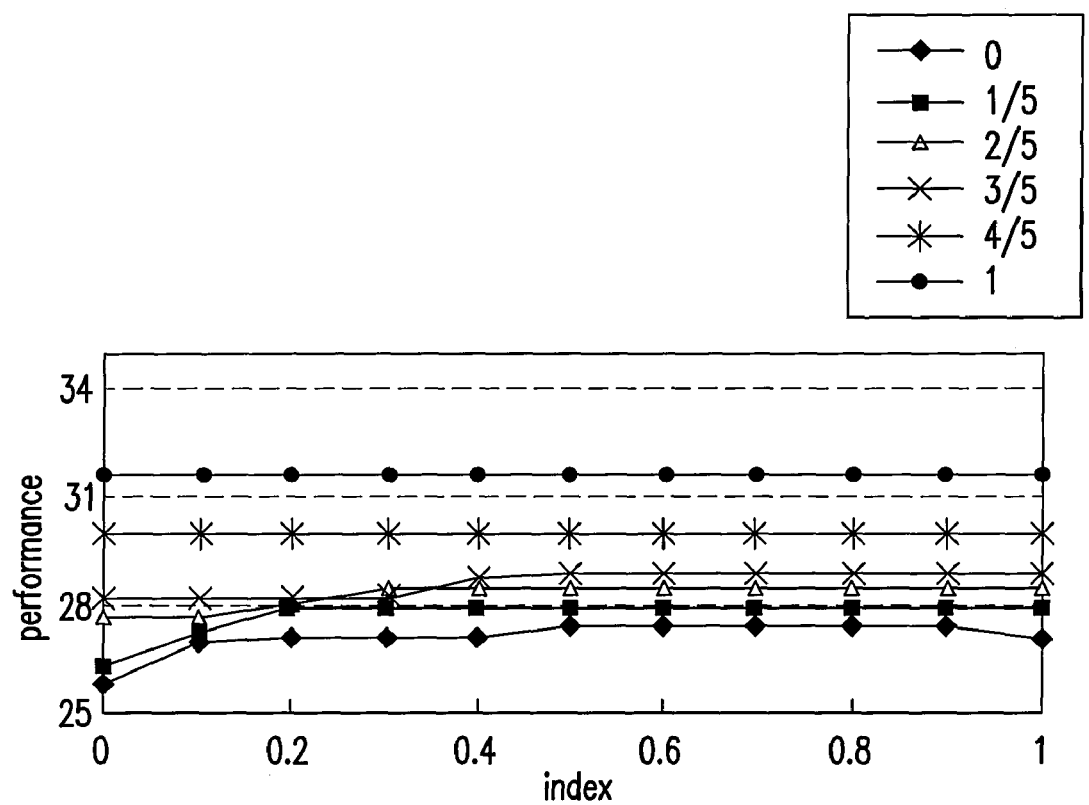
FIG. 12 is a graph showing the quality estimations corresponding to the indices of FIG. 11 according to an embodiment of the present invention.

FIG. 12 is a graph showing the quality estimations corresponding to the indices of FIG. 11 according to an embodiment of the present invention. Referring to FIG. 12, a system can set the index value as 0.4, which is corresponding to the synthesized image with the best performance regarding the image quality (PSNR) and the visualization effect. According to the validation in practice, the image edges of the object are clear and the image color of the object has no noticeable distortion. Therefore, the implementation scheme provided by the present invention, for example, deciding the image concoction interpolation mechanism in the algorithm by using the index value is able to effectively achieve the required quality of the synthesized image and the visualization effect, where two different concoction schemes are suitable for all the virtual image positions. Note that the scheme by using the index value is merely an embodiment and the present invention is not limited to.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for synthesizing an image with multi-view images, comprising:
    inputting a plurality of reference images, wherein each of the reference images is photographed correspondingly to a reference viewing-angle;
    determining an intended synthesized image corresponding to a viewpoint and an intended viewing-angle;
    segmenting the intended synthesized image to obtain a plurality of meshes and a plurality of vertices of the meshes;
    respectively constructing a viewing-angle between the viewpoint and each of the vertices;
    searching a plurality of neighbouring images corresponding to each of the vertices among the reference images according to the viewing-angle;
    determining a plurality of possible vertex depth values, wherein one of the possible vertex depth values for each one of the vertices is determined by the following two steps:
        projecting a position of each one of the vertices onto each of the neighbouring images at a projection position according to each one of the possible vertex depth values, wherein for each one of the vertices, each one of the possible vertex depth values has a corresponding set of image areas as respectively projected on the neighbouring images; and
        for each one of the vertices, analyzing an image correlation value of the neighbouring images at each set of image areas, wherein the one of the possible vertex depth values has the best image correlation value is a proper depth value for the one of the vertices; and
    performing image synthesizing to produce the intended synthesized image according to the points corresponding to the proper depth values of the vertices, wherein when at least one of the neighbouring images falls within an adjacent region of the vertex, the intended synthesized image is produced in a first mode; when none of the neighbouring images falls within the adjacent region of the vertex, the intended synthesized image is produced in a second mode.

2. The method for synthesizing an image with multi-view images according to claim 1, wherein in the first mode, if there is an individual neighbouring image close enough, an image color data is directly taken to synthesize the intended synthesized image.

3. The method for synthesizing an image with multi-view images according to claim 1, wherein in the first mode, if there are two or more neighbouring images close enough, the neighbouring image with the maximum weighting value among the neighbouring images is taken as an image color data.

4. The method for synthesizing an image with multi-view images according to claim 1, wherein in the first mode, if there are two or more neighbouring images close enough, the two or more neighbouring images are averaged to obtain an image color data.

5. The method for synthesizing an image with multi-view images according to claim 1, wherein in the second mode, a weighting-based interpolation is performed on the neighbouring images to obtain an image color data.

6. The method for synthesizing an image with multi-view images according to claim 1, wherein a condition to decide selecting the first mode is to test a difference extent between a maximum weighting value and a next-to-maximum weighting value among the neighbouring images corresponding to the vertex; if the difference extent is greater than a threshold, the first mode is used to produce the intended synthesized image; otherwise, the second mode is used to produce the intended synthesized image.

7. The method for synthesizing an image with multi-view images according to claim 6, wherein the maximum weighting value and the next-to-maximum weighting value are normalized values.

8. The method for synthesizing an image with multi-view images according to claim 1, wherein the neighbouring images comprise the four reference images.

9. The method for synthesizing an image with multi-view images according to claim 1, further comprising determining a required region of interest corresponding to each of the neighbouring images according to a maximum depth and a minimum depth.

10. The method for synthesizing an image with multi-view images according to claim 1, wherein the step of determining the possible vertex depth values comprises:
setting a maximum depth $d_{max}$, a minimum depth $d_{min}$ and dividing the depth range between the maximum depth $d_{max}$ and the minimum depth $d_{min}$ into M depth values; and
the m-th depth $d_m$ is $$d_m = \frac{1}{\frac{1}{d_{max}} + \frac{m}{M-1}\left(\frac{1}{d_{min}} - \frac{1}{d_{max}}\right)},$$

wherein m is between 0 and (M−1).

11. The method for synthesizing an image with multi-view images according to claim 1, wherein in the step of analyzing the image correction value between the image areas of each the neighbouring image at the corresponding projection position, if the difference between the optimum vertex depth values of the vertices belonging to one of the meshes is greater than a threshold, the mesh is segmented into a plurality of smaller sub-meshes and an optimum vertex depth value of the vertices of the sub-meshes is re-calculated.

12. The method for synthesizing an image with multi-view images according to claim 11, wherein when the difference between any two vertices is greater than the threshold, the mesh is re-segmented.

13. The method for synthesizing an image with multi-view images according to claim 1, wherein in segmenting the intended synthesized image to obtain the meshes, the intended synthesized image is segmented by quadrangular shape with the meshes in triangle as a calculation unit.

14. The method for synthesizing an image with multi-view images according to claim 1, wherein the step of analyzing the image correlation value between the image areas of each the neighbouring image at the corresponding projection position comprises defining the correlation parameter $r_{ij}$ between the neighbouring images as follows:

$$r_{ij} = \frac{\sum_k (I_{ik} - \overline{I_i})(I_{jk} - \overline{I_j})}{\sqrt{\left[\sum_k (I_{ik} - \overline{I_i})^2\right]\left[\sum_k (I_{jk} - \overline{I_j})^2\right]}},$$

wherein i and j represent any two of the neighbouring images, $I_{ik}$ and $I_{jk}$ represent the k-th image data within the image areas respectively corresponding to the i neighbouring image and the j neighbouring image, and $\overline{I_i}$ and $\overline{I_j}$ represent the averaged pixel data values within the image area.

15. The method for synthesizing an image with multi-view images according to claim 14, wherein multiple of the correlation parameters $r_{ij}$ are obtained from multiple correlating pairs of the neighbouring images, and the neighbouring images are patched by a summation of the multiple of the correlation parameters $r_{ij}$ for judgement.

16. A method for synthesizing an image with multi-view images, comprising:
inputting a plurality of reference images, wherein each of the reference images is photographed correspondingly to a reference viewing-angle;
determining an intended synthesized image corresponding to a viewpoint and an intended viewing-angle;
segmenting the intended synthesized image to obtain a plurality of meshes and a plurality of vertices of the meshes;
respectively constructing a viewing-angle between the viewpoint and each of the vertices;
searching a plurality of neighbouring images corresponding to each of the vertices among the reference images according to the viewing-angle;
determining a plurality of possible vertex depth values, wherein one of the possible vertex depth values for each one of the vertices is determined by the following two steps:
projecting a position of each one of the vertices onto each of the neighbouring images at a projection position according to each one of the possible vertex depth values, wherein for each one of the vertices, each one of the possible vertex depth values has a corresponding set of image areas as respectively projected on the neighbouring images; and
for each one of the vertices, analyzing an image correlation value of the neighbouring images at each set of image areas, wherein the one of the possible vertex depth values has the best image correlation value is a proper depth value for the one of the vertices, when at least one of the neighbouring images falls within an adjacent region of the vertex, a first mode is used to synthesize the intended synthesized image; when none of the neighbouring images falls within the adjacent region of the vertex, a second mode is used to synthesize the intended synthesized image.

17. The method for synthesizing an image with multi-view images according to claim 16, wherein in the first mode, if there is an individual neighbouring image close enough, an image color data is directly taken to synthesize the intended synthesized image.

18. The method for synthesizing an image with multi-view images according to claim 16, wherein in the first mode, if there are two or more neighbouring images close enough, the neighbouring image with the maximum weighting value among the neighbouring images is taken as an image color data.

19. The method for synthesizing an image with multi-view images according to claim 16, wherein in the first mode, if there are two or more neighbouring images close enough, the two or more neighbouring images are averaged to obtain an image color data.

20. The method for synthesizing an image with multi-view images according to claim 16, wherein in the second mode, a weighting-based interpolation is performed on the neighbouring images to obtain an image color data.

* * * * *